US009726289B2

(12) United States Patent
Leska

(10) Patent No.: US 9,726,289 B2
(45) Date of Patent: Aug. 8, 2017

(54) SEALING ASSEMBLY, FLAT GASKET FOR A SEALING ASSEMBLY AND METHOD FOR MOUNTING A SEALING ASSEMBLY

(71) Applicant: AUDI AG, Ingolstadt (DE)

(72) Inventor: Wolfgang Leska, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/913,205

(22) PCT Filed: Jul. 30, 2014

(86) PCT No.: PCT/EP2014/002082
§ 371 (c)(1),
(2) Date: Feb. 19, 2016

(87) PCT Pub. No.: WO2015/024622
PCT Pub. Date: Feb. 26, 2015

(65) Prior Publication Data
US 2016/0208920 A1    Jul. 21, 2016

(30) Foreign Application Priority Data
Aug. 20, 2013 (DE) ......... 10 2013 013 859

(51) Int. Cl.
*F16J 15/12* (2006.01)
*F16J 15/06* (2006.01)
*F16J 15/08* (2006.01)

(52) U.S. Cl.
CPC ........... *F16J 15/061* (2013.01); *F16J 15/064* (2013.01); *F16J 15/0818* (2013.01); *F16J 2015/0868* (2013.01)

(58) Field of Classification Search
CPC ...... F16J 15/061; F16J 15/0818; F16J 15/0831
See application file for complete search history.

(56) References Cited

U.S. PATENT DOCUMENTS

| 4,011,997 A | 3/1977 | Klimas |
| 5,154,529 A | 10/1992 | Udagawa et al. |

(Continued)

FOREIGN PATENT DOCUMENTS

| CN | 102192327 | 9/2011 |
| DE | 40 04 319 A1 | 8/1991 |

(Continued)

OTHER PUBLICATIONS

International Search Report issued by the European Patent Office in International Application PCT/EP2014/002082.

(Continued)

*Primary Examiner* — Gilbert Lee
(74) *Attorney, Agent, or Firm* — Henry M. Feiereisen LLC

(57) ABSTRACT

A sealing assembly includes a first component having a first sealing surface, a second component having a second sealing surface and a flat gasket arranged in the space between the first sealing surface and the second sealing surface, wherein the gasket has a through-opening for a third component arranged at least partially in the first component and/or the second component and at least engaging in the through-opening. The flat gasket has retaining means for securing the third component, the retaining means releasing the third component in a release position of said flat gasket and fixing said third component in at least one direction with respect to the first component and/or the second component in a retaining position of the gasket.

11 Claims, 4 Drawing Sheets

(56) References Cited

U.S. PATENT DOCUMENTS

| | | | |
|---|---|---|---|
| 5,513,855 A | 5/1996 | Yasui | |
| 5,551,702 A | 9/1996 | Inamura | |
| 5,586,770 A | 12/1996 | Udagawa et al. | |
| 6,179,298 B1 | 1/2001 | Schweiger | |
| 6,386,593 B1 | 5/2002 | Slais et al. | |
| 2002/0159868 A1* | 10/2002 | Nadicksbernd | B24C 3/04 414/292 |
| 2002/0190479 A1 | 12/2002 | Sumi et al. | |
| 2003/0164594 A1 | 9/2003 | Whitlow et al. | |
| 2005/0040606 A1* | 2/2005 | Mendez-Ferreira | F22D 1/28 277/632 |
| 2008/0038049 A1 | 2/2008 | Kullen et al. | |

FOREIGN PATENT DOCUMENTS

| | | | | |
|---|---|---|---|---|
| DE | 199 52 329 A1 | 5/2000 | | |
| DE | 695 16 049 T2 | 8/2000 | | |
| DE | 695 16 050 T2 | 8/2000 | | |
| DE | 103 56 763 B4 | 7/2005 | | |
| DE | 102006046176 A1 * | 4/2008 | ........... | F16H 57/021 |
| DE | 10 2011 017 612 B4 | 10/2012 | | |
| JP | H08-49597 A | 2/1996 | | |
| WO | WO 2009/065420 A1 | 5/2009 | | |

OTHER PUBLICATIONS

Chinese Search Report issued on Nov. 1, 2016 with respect to counterpart Chinese patent application 2014800457301.

Translation of Chinese Search Report issued on Nov. 1, 2016 with respect to counterpart Chinese patent application 2014800457301.

* cited by examiner

SEALING ASSEMBLY, FLAT GASKET FOR A SEALING ASSEMBLY AND METHOD FOR MOUNTING A SEALING ASSEMBLY

CROSS-REFERENCES TO RELATED APPLICATIONS

This application is the U.S. National Stage of International Application No. PCT/EP2014/002082, filed Jul. 30, 2014, which designated the United States and has been published as International Publication No. WO 2015/024622 and which claims the priority of German Patent Application, Serial No. 10 2013 013 859.0, filed Aug. 20, 2013, pursuant to 35 U.S.C. 119(a)-(d).

BACKGROUND OF THE INVENTION

The invention relates to a sealing assembly with a first component having a first sealing surface, a second component having a second sealing surface, and a flat gasket which is flatly arranged between the first sealing surface and the second sealing surface, which flat gasket has a through-opening for a third component at least portions of which are arranged in the first component and/or the second component. The invention also relates to a flat gasket for a sealing assembly and a method for mounting a sealing assembly.

The first component and the second component are for example a part of a hydraulic device, in particular of a housing of the hydraulic device. By means of the flat gasket the two components are to be sealed against each other or sealingly fastened to each other. For this purpose they are provided with the first sealing surface and the second sealing surface, which are each preferably planar and are in particular arranged parallel to each other. The flat gasket has the through-opening in which at least regions of the third component are arranged. The third component also at least protrudes into the through-opening or completely traverses the through-opening.

At least regions of the third component are located either in the first component or the second component. When the third component traverses the through-opening it can of course be partially arranged in the first component as well as in the second component. The flat gasket engages about a portion or the entire third component. Correspondingly this also ensures that the third component is sealed against the environment of the sealing assembly. The third component is for example configured as a line, in particular as tube, and protrudes from the first component into the second component. Preferably the third component hereby traverses the first component and/or the second component completely.

From the state of the art for example the publication US 2002/0190479 A1 is known, which describes a metallic gasket.

SUMMARY OF THE INVENTION

It is an object of the invention to propose a sealing assembly, which enables a simpler handling of the sealing assembly, and in particular reduces costs for the mounting of the sealing assembly.

According to the invention this is achieved with a sealing assembly with the features of the independent device claim. The flat gasket has retaining means for fastening the third component, wherein the retaining means in a release position of the flat gasket release the third component and in a retaining position fix the third component relative to the first component and/or the second component in at least one direction. The flat gasket thus does not only have a sealing effect, but also a holding function. Correspondingly separate fastening means for fastening the third component on the first component and/or the second component can ideally be omitted. On one hand this reduces the costs associated with the mounting of the sealing assembly. In addition the number of parts of the sealing assembly can be reduced because the separate fastening means may preferably be completely omitted.

According to the invention it is particularly significant that not only the retaining means are provided on the flat gasket but also that the flat gasket can additionally be brought into different positions, for example by shifting on the first sealing surface or the second sealing surface. In the release position of the flat gasket the third component is released so that its displacement relative to the first component and/or the second component is not impeded by the flat gasket of the retaining means. When on the other hand the flat gasket is displaced into its retaining position the third component is then fixed in at least one direction relative to the first component and/or the second component. The third component can hereby be force fittingly and/or form fittingly held by means of retaining means.

During mounting of the sealing assembly the flat gasket is thus first placed on one of the sealing surfaces and the third component is arranged so that it at least protrudes or engages into the through-opening. Subsequently the flat gasket is displaced into the retaining position so that the third component is fixed. Subsequently the second component is for example arranged on the first component so that the second sealing surface sealingly rests against the side of the flat gasket, which is arranged on the first sealing surface of the flat gasket. For fastening the second component on the first component appropriate means are provided for example at least one screw connection.

Preferably after the mounting of the sealing assembly the first component and the second component clampingly hold the flat gasket between each other so that a displacement of the flat gasket from the retaining position, in particular in the direction of the release position, is not possible. The third component is hereby for example held force fittingly and/or force fittingly.

In a preferred embodiment of the invention it is provided that on the first component, the second component or the third component a sealing element, in particular a sealing plug is provided, which protrudes into a receiving opening of the first component and/or the second component and sealingly rests against an inner circumference surface of the receiving opening. The sealing element or the sealing plug can be formed integrally with the third component or alternatively be arranged as a separate element on a base body of the third component. The sealing element is hereby preferably assigned to the third component. Alternatively the sealing element can also be present on the first component or the second component. The sealing element for example consists of a sealing material, particularly preferably of the same material as the flat gasket. In particular the material of which the sealing element consists is elastic so that the third element can be introduced into the receiving opening together with the sealing element without problems.

The sealing element or the sealing plug is in particular advantageous when the third component is present in the form of a tube. In this case the receiving opening is preferably greater in axial direction relative to the longitudinal center axis of the line than the tube. By means of the sealing element for example tolerances, in particular position tolerances and/or angle tolerances can be compensated easily. It is only important that the sealing element is sealingly present on or sealingly rests against the third component or its base body and that the base body at the same time sealingly rests against the inner circumferential surface of the receiving opening to thereby realize a tight connection between the third component and the inner circumferential surface.

A further embodiment of the invention provides that the third component, in particular the sealing element, has a retaining notch into which the retaining means engage in the retaining position so that the third component is fixed. Correspondingly a form-fitting fastening of the third component relative to the first component and/or the second component is present. The retaining notch is preferably provided over the entire outer circumference of the third component or the sealing element, in order to avoid a laborious orientation of the retaining notch relative to the retaining means during mounting. Rater it is preferably sufficient to arrange the third component in the receiving opening so that the axial position of the retaining notch corresponds with the axial position of the retaining means. The retaining of the third component can insofar be realized independent of a positioning of the retaining notch in circumferential direction. Particularly preferably, the retaining notch is formed in the sealing element or the sealing plug. In this case the sealing element is preferably fixedly connected with the third component or its base body, for example force fittingly, form fittingly and/or materially bonding.

A further embodiment of the invention provides that the retaining means at least partially delimit the through-opening as retaining rim. The retaining means are thus present in the form of the rim of the through-opening or insofar form the retaining rim. The retaining rim is configured so that it can engage into the retaining notch in the retaining position. Insofar the retaining rim has a thickness, which correspond to the width of the retaining notch. In other words the dimensions of the retaining rim and the retaining notch are preferably identical in axial direction. Alternatively the retaining rim can of course also have smaller dimensions so long as the retaining function of the third component is thereby ensured. Hereby also a clearance of a defined size is possible.

When the retaining means are configured as retaining rim, the though-opening is preferably of the same size in radial direction as the third component or the sealing element. This means that the third component can first be passed through the though-opening or can at least be displaced into the through-opening. Subsequently the flat gasket is displaced into the retaining position, wherein a region of the rim of the through-opening, which is referred to as retaining rim, engages with the third component, in particular into the retaining notch, for fixing the third component.

A particularly preferred embodiment of the invention provides that the though-opening is configured to have a closed border. After the mounting, the through-opening thus completely engages about the third component in circumferential direction. The through-opening thus does not interrupt a rim of the flat gasket at any point.

A further, preferred embodiment of the invention provides that the fastening means for fastening the flat gasket are provided on the first component, the second component and/or the third component, wherein in the release position the flat gasket is displaceable in the at least one direction relative to the first component, the second component and/or the third component and is fixed in the retaining position. In order to further simplify the mounting of the sealing assembly the fastening means are provided. These serve for fastening the flat gasket on at least one of the components, preferably on all components. The fastening means are hereby configured so that their action also depends on the position of the flat gasket.

When the flat gasket is in the release position it can easily be removed from the first component, the second component or the third component or arranged thereon. In the retaining position on the other hand the flat gasket is fixed on the first component the second component and/or the third component, i.e., it can no longer be displaced at least in the at least one direction. At most a displacement of the flat gasket out of the retaining position in the direction of the release position is possible, in particular in order to the be able to remove the flat gasket from the corresponding component.

A further embodiment of the invention provides that the fastening means have at least one holding protrusion and a holding receptacle which interacts with the holding protrusion for fastening the flat gasket in the retaining position. Preferably the holding protrusion engages at least in the retaining position in the holding receptacle so that a form fitting connection between for fixing the flat gasket is achieved with the fastening means. The retaining protrusion can be formed by the third component and the retaining receptacle by the through-opening. In this case the retaining means are partially integrated with the third component. Of course also a separate configuration of the retaining means is possible.

It can also be provided that the retaining protrusion is present on the first component or the second component and the retaining receptacle on the flat gasket. For example the retaining protrusion has a retaining head, which is present on the side of the retaining protrusion, which faces away from the first component. The retaining head has a greater diameter than a retaining body of the retaining head via which the retaining head is fastened on the first component. The retaining head and also the retaining body preferably have a round cross-section. The retaining receptacle preferably has a shape that is adapted to the retaining protrusion. For example the retaining receptacle consists of a region, which has dimensions, which correspond to or are greater than the dimensions of the retaining head. A further region of the retaining receptacle has dimensions, which correspond to or are greater than the dimension of the retaining body, which however at the same time are smaller than the dimensions of the holding head.

In such a configuration the holding protrusion can easily be introduced into the first region in to the holding receptacle . . . when subsequently the flat gasket is displaced so that the holding head of the retaining body are now present in the second region, the holding head prevents that the holding protrusion can be displaced out of the holding receptacle without generating the first position again. Correspondingly also the flat gasket is held on the first component or the second component. Particularly preferably in the release position of the flat gasket the holding protrusion is arranged in the first region of the holding receptacle and in the retaining position in the second region of the holding receptacle.

The invention also relates to a flat gasket for a sealing assembly, in particular according to the description above. The flat gasket is provided for flat arrangement between a first component having a first sealing surface and a second component having a second sealing surface, wherein the flat gasket has a through-opening for a third component at least regions of which are arranged in the first component and/or the second component and which at least partially engages in the through-opening.

Hereby it is provided that the flat gasket has retaining means for fastening the third component, wherein the retaining means in a release position of the flat gasket release the third component and in a retaining position fix the flat gasket in at least one direction relative to the first component and/or the second component. The advantages of such a configuration of the flat gasket were described above. The flat gasket and the sealing assembly can be refined according to the description above so that reference is made to this description.

The invention also relates to a method for mounting a sealing assembly, in particular a sealing assembly according to the description above. The sealing assembly has a first component having a first sealing surface, a second component having a second sealing surface and a flat gasket flatly arranged between the first sealing surface and the second sealing surface. The flat gasket has a through-opening for a third component at least regions of which are arranged in the first component and/or the second component and which at least partially engages in the though opening.

The method is characterized in that during mounting the flat gasket is displaced from a release position into a retaining position and the flat gasket has retaining means for fastening the third component, wherein the retaining means in the release position release the third component and in the retaining position fix the third component in at least one direction relative to the first component and/or the second component. Also with regard to the method reference is made to the description above, which describes advantageous embodiments of the method.

BRIEF DESCRIPTION OF THE DRAWING

In the following the invention is explained in more detail by way of exemplary embodiments shown in the drawing, without limiting the invention. Hereby it is shown in.

DETAILED DESCRIPTION OF PREFERRED EMBODIMENTS

Figure 1:
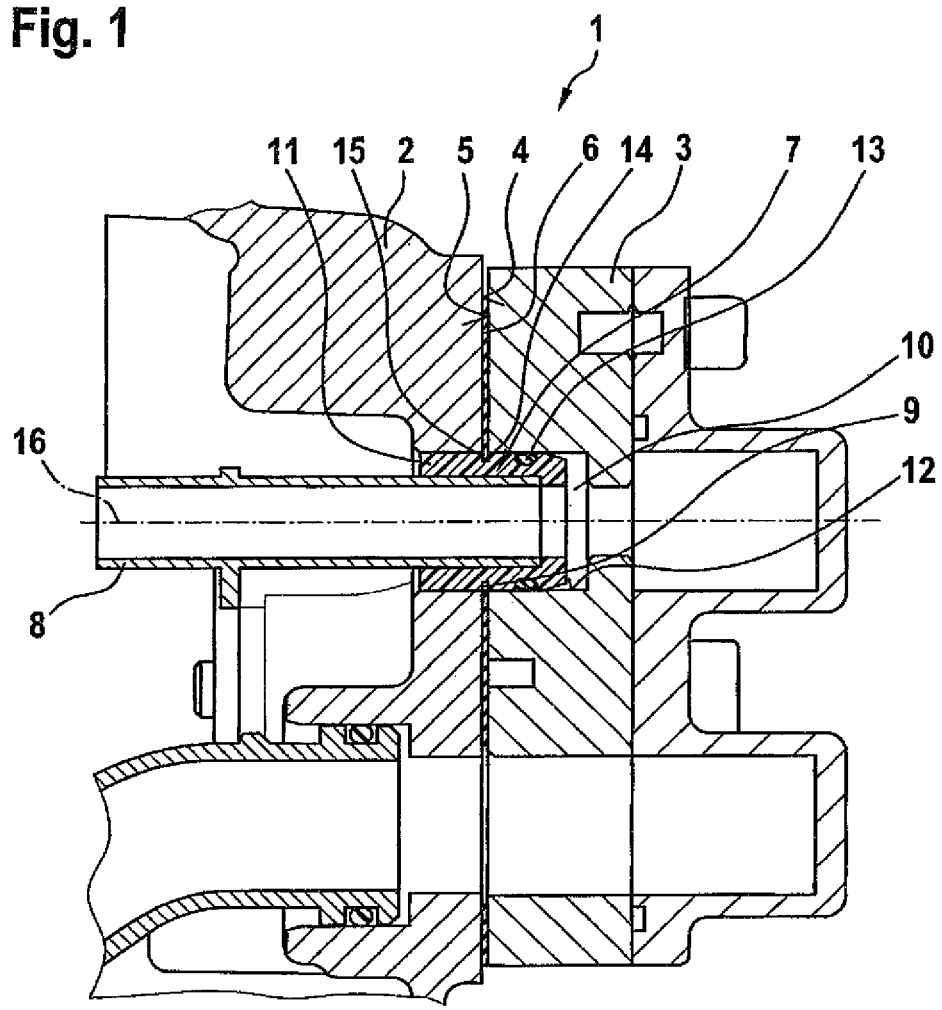
FIG. 1 a sectional view of a sealing assembly with a first component, a second component and a flat gasket arranged between the first and second component, FIG. 2 a detail view of a region of the sealing assembly, FIG. 3 a detail view of a region of the sealing assembly after a first mounting step, and FIG. 4 the region of the sealing assembly after a second mounting step.

FIG. 1 shows a sealing assembly 1 with a first component 2 and a second component 3. The first component 2 has a first sealing surface 4, while a second sealing surface 5 is provided on the second component 3. For example the components 2 and 3 are part of a transmission housing or the like. Between the components 2 and 3 a flat gasket 6 is provided, which respectively rests flat against the sealing surfaces 4 and 5. Correspondingly the components 2 and 3 are sealingly fastened to each other.

Beside the components 2 and 3 a third component 7 is provided which is in particular present in the form of a line or pipe. A base body 8 of the third component 7 is insofar a tube. The third component 7 engages through the first component 2 and a through-opening 9 of the flat gasket 6. In the here shown exemplary embodiment the third component 7 protrudes into the second component 3, in particular into a receiving opening 10. Hereby the third component 7, in particular a sealing plug 11 of the third component 7, sealingly rests against an inner circumferential surface 12 of the receiving opening 10. For this purpose preferably a sealing 13 is provided which is for example configured as an O-ring, which is inserted in a here not shown recess of the sealing plug 11.

It can be seen that the third component 7, i.e., here the sealing plug 11, has a retaining notch 14 into which a region of the flat gasket 6 engages. This region is a part of the rim of the through-opening 9, which insofar is referred to as retaining rim 15. Due to the engagement of the retaining rim 156 into the retaining notch 14 the third component 7 is fixed at least in axial direction—relative to its longitudinal center axis 16. However, this is only the case in a retaining position of the flat gasket 6. In a release position of the flat gasket 6 on the other hand the third component 7 is released so that it can also for example be removed from the components 2 and 3, in particular from the receiving opening 10.

Figure 2:
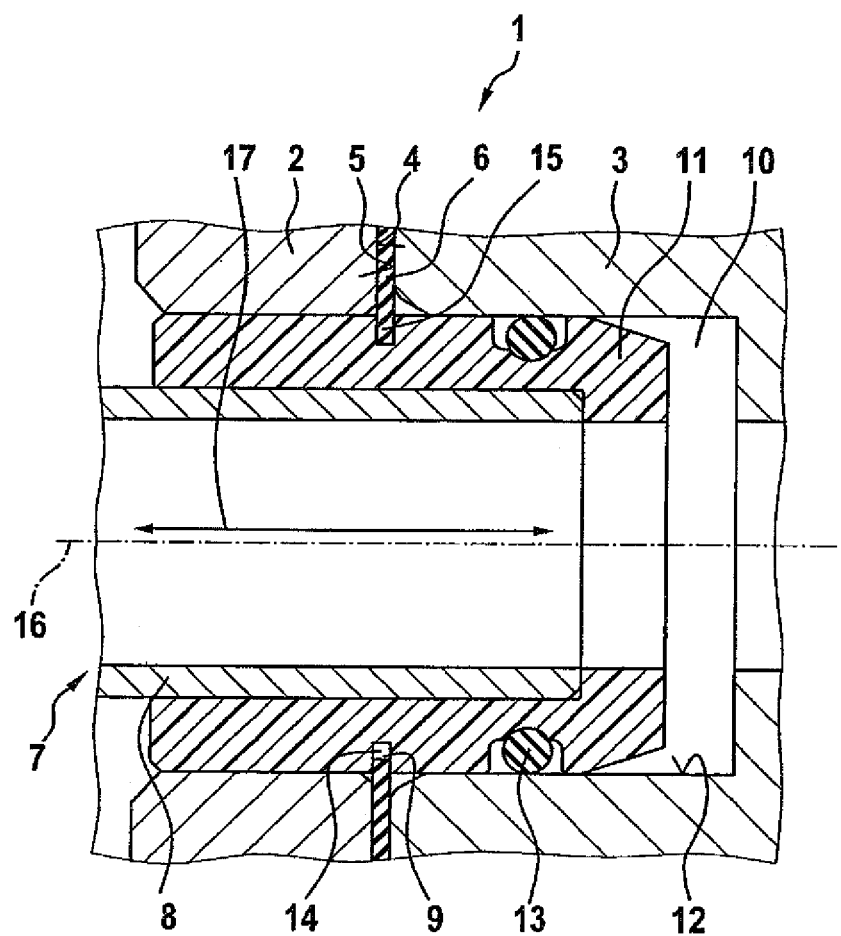

FIG. 2 shows a detail view of a region of the through-opening 1. It can again be seen that the retaining rim 15 and insofar the region of the flat gasket 6 engages in the retaining notch 14 of the third component so that the latter is held in axial direction relative to the longitudinal center axis 16 relative to the components 2 and 3 because the flat gasket 6 is clampingly arranged between the components 2 and 3. A displacement of the third component 7 in the direction of the double arrow 17 is thus no longer possible. The sealing plug 1 is preferably fastened force-fittingly and/or materially bonding in the base body 8 so that the base body cannot easily move out of the sealing plug 11.

Figure 3:
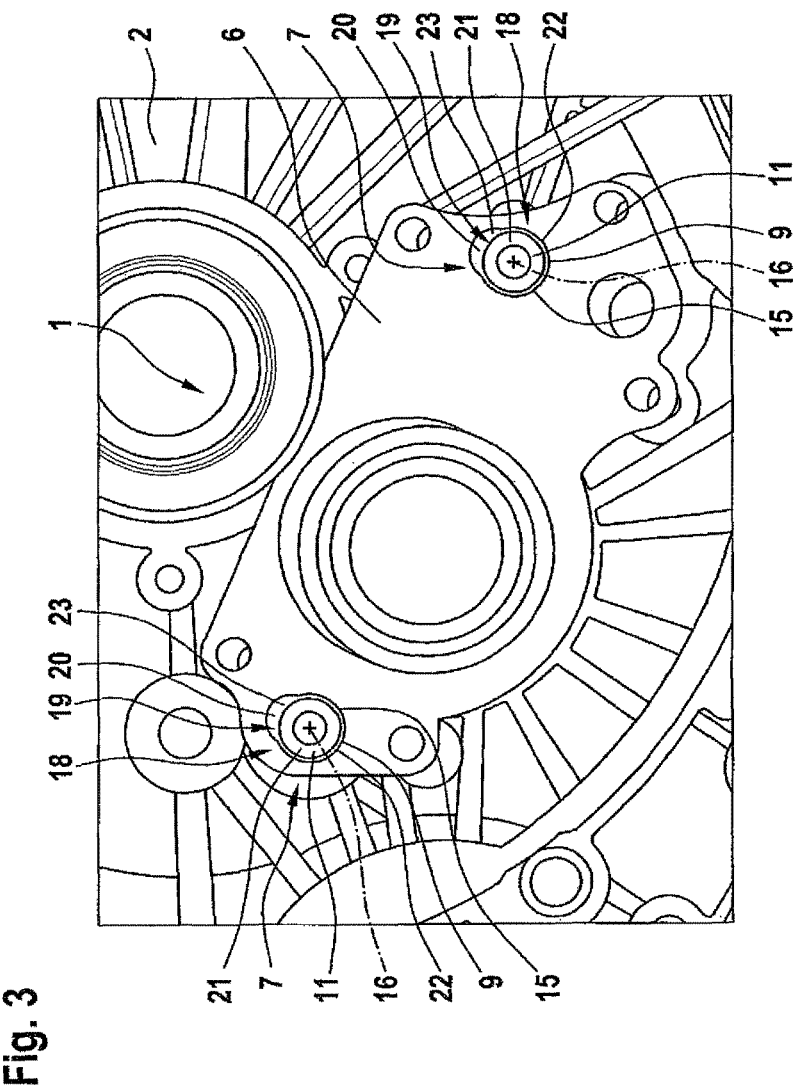

FIG. 3 shows a region of the sealing assembly 1 after a first mounting step. Hereby the flat gasket 6 is placed on the here not visible first sealing surface 4 of the first component 2. In addition the third component 7, which has the base body 8, the sealing plug 11 and the gasket 13, is already arranged in the through-opening 9. The flat gasket 6 hereby is in its release position so that the third component 7 can easily be displaced in axial direction relative to the longitudinal center axis 16. In the present exemplary embodiment two components 7 are provided. It can also be recognized that fastening means 18 are provided. These serve in particular for fastening the third component 7 relative to the flat gasket 6. In addition or alternatively the fastening means 18 can also serve for fastening the flat gasket 6 in the first component 2. At least regions of the fastening means 18 can, as shown here, be formed by the third component 7. Alternatively they can however also be configured separate from the third component. The fastening means 18 for example consist of a retaining protrusion 19 and a retaining receptacle 20, wherein the former is present on the first component 2 and the latter in the flat gasket. The retaining protrusion 19 has hereby preferably a holding head 21 and a here not visible retaining body. Preferably multiple of these fastening means 18 are provided in order to achieve a reliable fastening of the flat gasket 6, in particular on the third component 7 and/or on the first component 2. The retaining receptacle 20 consists of a region 22 having a greater diameter and a region 23 having a smaller diameter. The diameter of the regions 22 and 23 are configured so that in the here not shown release position the holding head 21 can be introduced though the region 23 into the retaining receptacle 20.

In the here shown embodiment the retaining protrusion 19 is preferably formed by the third component 7, while the retaining receptacle 20 for example corresponds to the though-opening 9.

Figure 4:
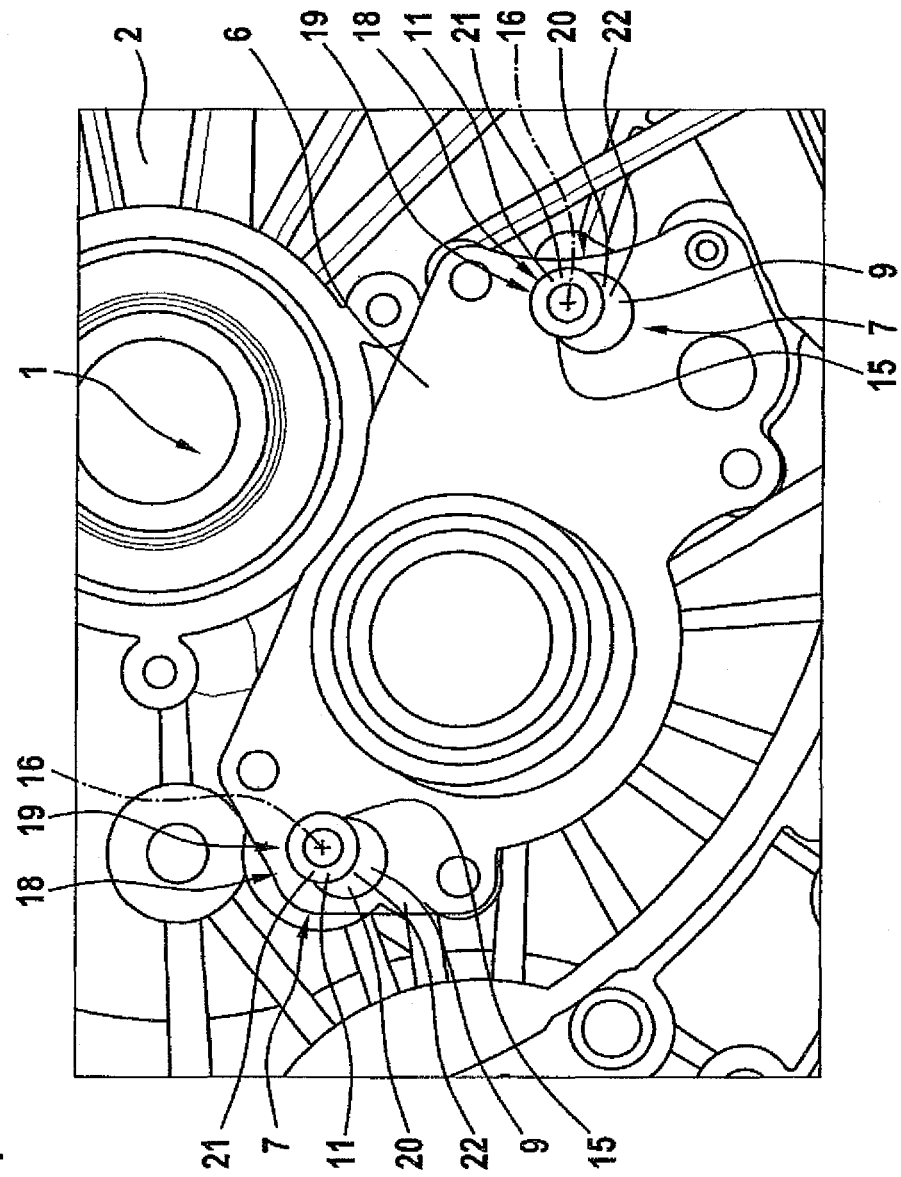

In the following the flat gasket 6 is displaced in the direction of its retaining position. The retaining position is shown in FIG. 4, which also shows the already known detail view of the sealing assembly 1. It can be seen that now on one hand the retaining protrusion 19 is present in the region 23 of the retaining receptacle 20, which has a smaller diameter than the retaining head 21. Correspondingly the flat gasket 6 is fixed at least in axial direction relative to the longitudinal center axis 16. Because in the retaining position the retaining rim 15 also engages in the retaining notch 14 the third component 7 is also fastened relative to the second component 2 when the flat gasket 6 is fastened relative to the first component 2. Correspondingly the here shown embodiment of the flat gasket 6 enables a simple and fast mounting of the sealing assembly 1.

After bringing the flat gasket 6 into the retaining position the second component 3 now only has to be fastened on the first component 2 so that the flat gasket 6 is received between the sealing surfaces 4 and 5 and sealingly rests against the sealing surfaces 4 and 5. Preferably the second component 3 is hereby fastened on the first component 2 so that the flat gasket 6 is clampingly held between the first and second components. In addition also a form-fitting retaining can be provided for example by means of a further retaining protrusion 19 which extends from the second component 3 and after fastening of the components 2 and 3 to each other prevents a displacement of the flat gasket 6 from the retaining position. Because the flat gasket 6 is also fixed in the retaining position, the third component 7 is securely held relative to the components 2 and 3.

The invention claimed is:

1. A sealing assembly, comprising:
a first component having a first sealing surface;
a second component having a second sealing surface;
a flat gasket arranged flat between the first sealing surface and the second sealing surface and having a through opening;
a third component, at least regions of the third component being arranged in the first component and/or in the second component, said third component at least engaging in the through-opening of the flat gasket, wherein in a release position of the flat gasket the third component is movable relative to the first and second component and in a retaining position of the flat gasket at least a portion of a rim of the through opening engages in a retaining notch of the third component thereby fixing the third component relative to the first component and/or the second component at least in one direction, wherein in the release position the at least one portion of said rim does not engage in the retaining notch of the third component,
wherein the flat gasket is movable from the release position into the retaining position by shifting on the first sealing surface or the second sealing surface; and
fastening elements for fastening the flat gasket on the first component and/or the second component, wherein in the release position the flat gasket is displaceable relative to the first component, and/or the second component in the at least one direction and is fixed in the retaining position.

2. The sealing assembly of claim 1, further comprising a sealing element provided on the first component, the second component or the third component, said sealing element protruding into a receiving opening of the first component and/or the second component and sealingly rests against an inner circumference surface of the receiving opening.

3. The sealing assembly of claim 2, wherein the sealing element is constructed as a sealing plug.

4. The sealing assembly of claim 3, wherein the third component has a retaining notch into which the retaining means engage in the retaining position so that the third component is fixed.

5. The sealing assembly of claim 4, wherein the retaining notch is provided on the sealing element of the third component.

6. The sealing assembly of claim 1, wherein the retaining means delimit a least regions of the through-opening in the form of a retaining rim.

7. The sealing assembly of claim 1, wherein the through-opening has a closed rim.

8. The sealing assembly of claim 1, wherein the fastening means have at least one retaining protrusion and a retaining receptacle, which in the retaining position interacts with the retaining protrusion for fixing the flat gasket.

9. The sealing assembly of claim 1, wherein the retaining protrusion is present on the first component or the second component and the retaining receptacle is present on the flat gasket.

10. A flat gasket for a sealing assembly, for flat arrangement between a first sealing surface of a first component of a sealing assembly and a second sealing surface of a second component of the sealing assembly, said flat gasket having a through-opening for a third component of the sealing assembly at least regions of which are arranged in the first component and/or the second component and which at least engages in the through-opening, wherein in a release position of the flat gasket the third component is movable relative to the first and second component and in a retaining position of the flat gasket at least a portion of a rim of the through-opening engages in a retaining notch of the third component thereby fixing the third component relative to the first component and/or the second component at least in one direction, wherein in the release position of the at least one portion of said rim does not engage in the retaining notch of the third component.

11. A method for assembling a sealing assembly, said sealing assembly comprising a first component having a first sealing surface; a second component having a second sealing surface, a flat gasket arranged flat between the first sealing surface and the second sealing surface, a third component, at least regions of the third component being arranged in the first component and/or in the second component, said third component at least engaging in a through-opening of the second component, and fastening elements for fastening the flat gasket on the first component and/or the second component, said method comprising:
during assembly of the sealing arrangement, displacing the flat gasket from a release position into a retaining position by shifting the flat gasket on the first sealing surface or the second sealing surface, wherein in the release position the flat gasket is displaceable relative to the first component, and/or the second component in the at least one direction and is fixed in the retaining position, wherein in the release position of the flat gasket the third component is movable relative to the first and second component and in a retaining position of the flat gasket at least a portion of a rim of the through-opening engages in a retaining notch of the third component thereby fixing the third component relative to the first component and/or the second component at least in one direction, wherein in the release position of the at least one portion of said rim does not engage in the retaining notch of the third component.

* * * * *